(12) United States Patent
Sato et al.

(10) Patent No.: US 7,113,665 B2
(45) Date of Patent: Sep. 26, 2006

(54) OPTICAL ROUTER

(75) Inventors: Chie Sato, Musashino (JP); Shinji Iio, Musashino (JP); Shinji Kobayashi, Musashino (JP); Sadaharu Oka, Musashino (JP); Tsuyoshi Yakihara, Musashino (JP); Akira Miura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 262 days.

(21) Appl. No.: 10/763,285

(22) Filed: Jan. 26, 2004

(65) Prior Publication Data
US 2004/0184713 A1 Sep. 23, 2004

(30) Foreign Application Priority Data
Mar. 17, 2003 (JP) .............................. 2003-071714

(51) Int. Cl.
*G02B 6/26* (2006.01)

(52) U.S. Cl. .............................. 385/17; 385/16; 398/53

(58) Field of Classification Search .................. 385/14, 385/16–24; 398/52–54, 98–102
See application file for complete search history.

(56) References Cited

U.S. PATENT DOCUMENTS 6,721,315 B1 * 4/2004 Xiong et al. ................. 370/389

FOREIGN PATENT DOCUMENTS

| JP | 8-163610 | 6/1996 |
| JP | 8-204675 | 8/1996 |
| JP | 2001-255567 | 9/2001 |
| JP | 2002-258084 | 9/2001 |
| JP | 2001-164847 | 6/2002 |

OTHER PUBLICATIONS

"Photonic Network Revolution—Technologies for realizing the world's most advanced information technology nation": published by the Secretariat, Photonic Internet Forum, within The Support Center for Advanced Telecommunications Technology Research, Foundation (Jan. 2002): 95-98.

* cited by examiner

*Primary Examiner*—Kevin S. Wood
(74) *Attorney, Agent, or Firm*—Westerman, Hattori, Daniels & Adrian, LLP.

(57) ABSTRACT

An optical router capable of efficiently allocating optimum optical paths to optical signals at optimum timings is provided in accordance with the present invention. The optical router is capable of delaying a plurality of the optical signals containing routing information attached to the header parts thereof. The optical router contains an optical switch which has a plurality of input and output ports; an optical-electrical converter for converting a plurality of the optical signals to electrical signals; memory wherein path control information and delay time information are stored; and a controller for generating an electrical routing control signal which can change the optical path of the optical signals by finding the path control information according to the routing information extracted from the output of the optical-electrical converter and which can delay the electrical routing control.

11 Claims, 11 Drawing Sheets

FIG.7

| Item | Delay time |
|---|---|
| With out FEC processsting | DT51 |
| With out FEC processsting (algorythmA) | DT52 |
| With out FEC processsting (algorythmB) | DT53 |
| With out FEC processsting (algorythmC) | DT54 |
| Forwarding error | DT55 |

OPTICAL ROUTER

BACKGROUND OF THE INVENTION

1. Field of the Invention

The present invention relates to an optical router which is disposed on an optical node basis, selects optical paths for optical signals transmitting them through such optical transmission lines as optical fibers, and outputs the optical signals through the optical paths, whereby an optical communications network is formed. More specifically, the present invention relates to an optical router capable of efficiently allocating optimum optical paths to the optical signals at optimum timings.

2. Description of the Prior Art

An optical router is disposed on an optical node basis, selects the optical path of an optical signal transmitting it through such an optical transmission line as an optical fiber, and outputs the optical signal through the optical path, whereby an optical communications network is formed. Publications on the prior art related to optical routers include the following:

Japanese Laid-open Patent Application 1996-163610
Japanese Laid-open Patent Application 1996-204675
Japanese Laid-open Patent Application 2001-255567
Japanese Laid-open Patent Application 2001-255084
Japanese Laid-open Patent Application 2002-164847

"Photonic Network Revolution  Technologies for realizing the world's most advanced information technology nation": published by the Secretariat, Photonic Internet Forum, within The Support Center for Advanced Telecommunications Technology Research, Foundation (January 2002): 95–98

FIG. 1 is a block diagram illustrating an example of such a conventional optical router as mentioned above, where the example is identical to the optical router described in the patent application 2002-284970 filed by the applicant of the application concerned.

The patent application 2002-284970 filed by the applicant of the application concerned illustrates an example of an optical router wherein an optical signal (optical packet signal) being transmitted is split into a header part and a data part, and routing information, such as a destination address, is added to the header part according to the routing information, thereby permitting a selection to be made from given optical paths.

FIG. 1 indicates optical delay means 1 for delaying optical input signals by desired lengths of time by circulating (transmitting) the signals through a fiber-optic optical loop as many times as desired, an optical-electrical converter 2, such as a photodiode or phototransistor, optical switch 3 provided with three input ports and three output ports, controller 4 for controlling optical path selection made by optical switch 3; and memory 5 wherein path control information, such as routing tables, is stored. In addition, optical delay means 1, optical-electrical converter 2, optical switch 3, controller 4 and memory 5 compose optical router 50.

In FIG. 1, the three optical input signals indicated by SG01 are input to the three input ends of optical delay means 1, as well as to the three input ends of optical-electrical converter 2.

Optical output signals from the three output ends of optical delay means 1 are input to the three input ports of optical switch 3, and the three optical output signals indicated by SG02 in FIG. 1 are output from the three output ports of optical switch 5.

The electrical output signal of optical-electrical converter 2 is coupled with controller 4, and the electrical delay control signal of controller 4 and the electrical routing control signal thereof indicated by SS01 are coupled with the control terminals of optical delay means 1 and optical switch 3. In addition, the electrical input-output signal of controller 4 is mutually coupled with memory 5.

Now the behavior of the example of the prior art optical router illustrated in FIG. 1 is described by referring to FIG. 2. FIG. 2 is a schematic view illustrating a specific example of optical delay means 1 and indicates an optical switch 6 and optical fiber 7 composing the optical loop.

The optical input signals indicated by SG01 in FIG. 1, which contain routing information, such as destination addresses, added to the header parts thereof, are delayed at optical delay means 1 by desired lengths of time just long enough for controller 4 or any other element to process electrical signals.

For example, optical switch 6 is controlled so that the path of an optical input signal is changed, the signal is entered to the optical loop comprised of optical fiber 7, and the optical input signal is transmitted while being circulated as indicated by RP11 in FIG. 2. If optical switch 6 is controlled under this condition so that the optical input signal is confined within the optical loop, a delay time, which is as long as the duration required for the signal to circulate (transmit) through optical fiber 7, occurs.

Consequently, by circulating (transmitting) the optical input signal through the optical loop as many times as desired and controlling optical switch 6 to let the signal out of the optical loop so that the delay time is properly adjusted, it is possible to delay the optical input signal by lengths of time just long enough for controller 4 or any other element to process electrical signals.

Concurrently, the optical input signals indicated by SG01 in FIG. 1, which contain routing information, such as destination addresses, added to the header parts thereof, are converted to electrical signals at optical-electrical converter 2 and input to controller 4.

Controller 4 extracts the routing information from the electrical signal being input from optical-electrical converter 2, finds path control information stored in memory 5 according to the routing information, specifies a subsequent-stage optical router (output port) appropriate for the entered optical signals to transmit the signal to the destination through the shortest path, and accordingly selects from the optical paths of optical switch 3 by outputting the electrical routing control signal indicated by SS01 in FIG. 1.

For example, controller 4 controls optical switch 3 so that an optical path is selected in such a manner that an optical input signal is input to the input port of optical switch 5 indicated by PT01 in FIG. 1, and is output from the output port of optical switch 3 indicated by PT02.

If such an optical input signal as is properly delayed by optical delay means 1 after the completion of such optical path selection as described above is input to the input port of optical switch 3 indicated by PT01, the optical output signal will be output from the output port indicated by PT02.

This means that by adding routing information, such as a destination address, to the header part of an optical signal, it is possible to make optical path selections according to the routing information.

Furthermore, since it is possible for optical delay means 1 to delay the optical input signals by desired lengths of time just long enough for controller 4 or any other element to process electrical signals, it is also possible to cope with such problems as the occurrence of large delay times resulting from the failure to transfer the optical input signals (optical packets).

However, since the example of the prior art optical router is configured so that the optical input signals are circulated (transmitted) through the optical loop comprised of optical fiber 7 as many times as desired using optical delay means 1 and optical switch 6 is controlled to let the signals out of the optical loop so that the delay time is properly adjusted, the delay time has discrete values.

Let us take FIG. 3, which is a timing diagram illustrating the way delay times are produced by optical delay means 1, as an example. In FIG. 3, optical signal (no delay) (a) delays changing optical signal (one-turn delay) (b), optical signal (two-turn delay) (c), optical signal (three-turn delay) (d) and optical signal (four-turn delay) (e) step by step, as the number of circulations (turns) at the optical loop comprised of optical fiber 7 increases to one circulation (turn), two circulations (turns), three circulations (turns) and four circulations (turns).

More specifically, a delay time indicated by TD21 in FIG. 3 is produced in the first turn, a delay time indicated by TD22 is produced in the second turn, a delay time indicated by TD23 is produced in the third turn, and a delay time indicated by TD24 is produced in the fourth turn. This means that a total delay time of "TD21+TD22+TD23+TD24" is produced as the result of making four turns.

Note that the delay time produced by a single turn is kept constant if the ambient environmental conditions (temperature, etc.) of optical fiber 7 composing the optical loop remain unchanged, and the following equation holds true:

$$TD21=TD22=TD23=TD24 \qquad (1)$$

For this reason, a delay time produced by optical delay means 1 equals an integer multiple of TD21 (number of circulations or turns), resulting in a discrete value.

On the other hand, the length of time just enough for controller 4 or any other element to process electrical signals greatly varies depending on whether or not forwarding error correction processing (hereinafter simply referred to as FEC processing) is applied. The length of time also varies greatly depending on the algorithm used even when FEC processing is applied.

Note however that as discussed earlier, the delay time resolution of optical delay means 1 is TD21 shown in FIG. 3. It is therefore not possible to fine-tune the delay time in increments smaller than TD21.

Let us take FIG. 4 as an example, which is a timing diagram illustrating the relationship between optical signals and an electrical routing control signal. FIG. 4 shows optical signal (no delay) (a), optical signal (one-turn delay) (b) whose number of circulations (turns) at the optical loop comprised of optical fiber 7 is one, and optical signal (two-turn delay) (c) whose number of circulations (turns) is two.

In FIG. 4, the time length indicated by PT31 in electrical routing control signal (d) is just long enough for controller 4 or any other element to process electrical signals. In order to secure such a time length, the optical signal in question must be delayed at optical delay means 1 by letting the signal undergo at least two circulations (turns), rather than one circulation (turn).

In this case, a dead time indicated by WT31 in FIG. 4 occurs during the time interval from when the required processing of electrical signals is completed at controller 4 or any other element within the time length indicated by PT31, to when controller 4 selects from the optical paths of optical switch 3 and the optical signal is delayed by TD21+TD22 before being allowed to enter optical switch 3.

This means that the optical paths of optical switch 3 are occupied during the time length indicated by WT31 in FIG. 4 even though none of the optical paths is used (no optical signals are transmitted). Consequently, the prior art optical router has had the problem that it is not possible to efficiently allocate optimum optical paths to optical signals (optical packets) at optimum timings.

Since the delay time indicated by TD21 in FIG. 4, for example, is extended in cases where the optical loop of optical delay means 1 is relatively long, the dead time indicated by WT31 is likely to increase further.

SUMMARY OF THE INVENTION

An object of the present invention is to realize an optical router capable of efficiently allocating optimum optical paths to optical signals at optimum timings.

BRIEF DESCRIPTION OF THE DRAWINGS

FIG. 7 is a timing diagram illustrating an example of delay time information stored in memory 9;

DETAILED DESCRIPTION OF THE PREFERRED EMBODIMENTS

Figure 5:
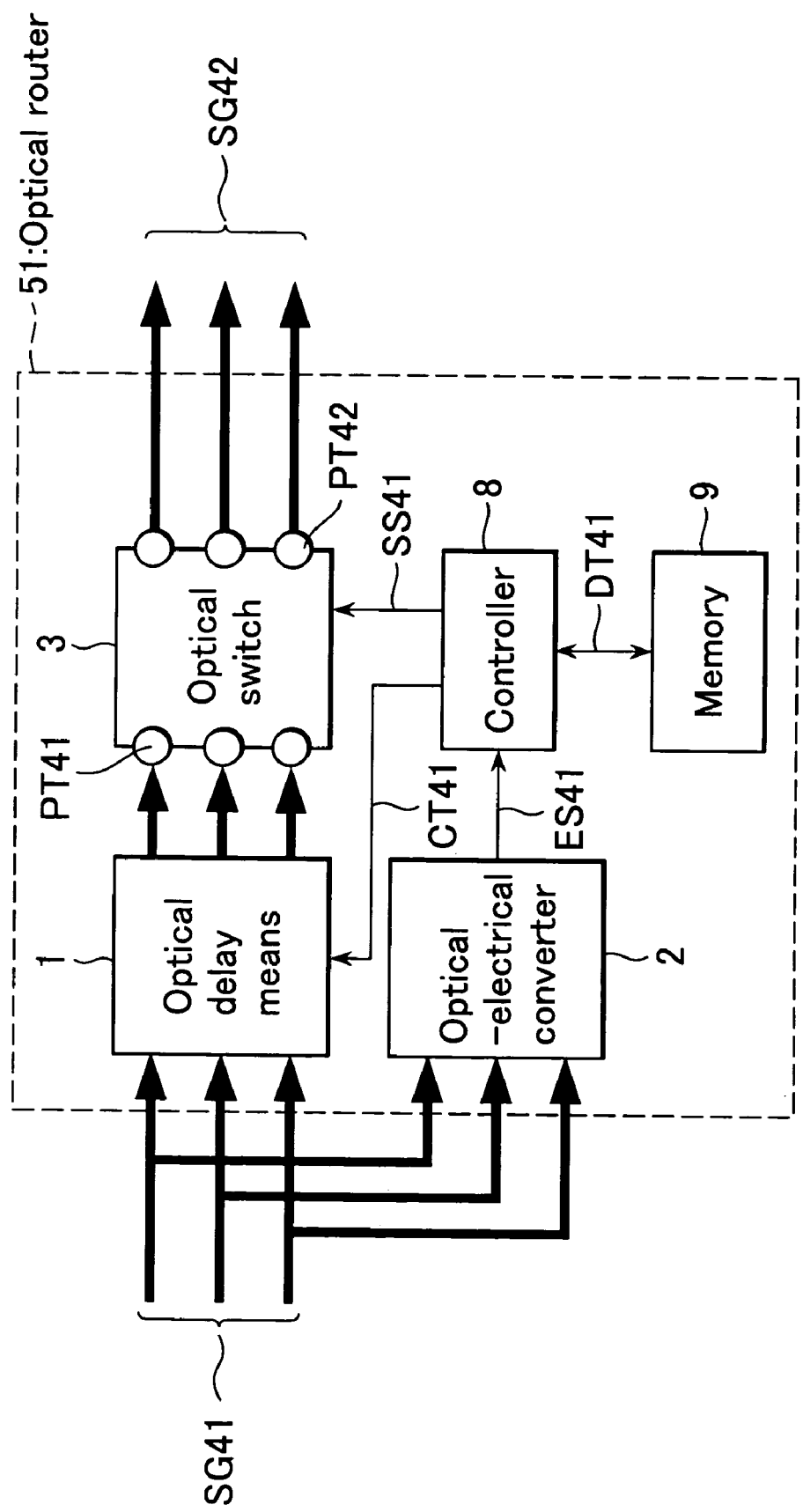
FIG. 5 is a block diagram illustrating one embodiment of an optical router in accordance with the present invention.

Preferred embodiments are hereinafter described in detail by referring to the accompanying drawings, wherein FIG. 5 is a block diagram illustrating one embodiment of an optical router in accordance with the present invention.

Figure 1:
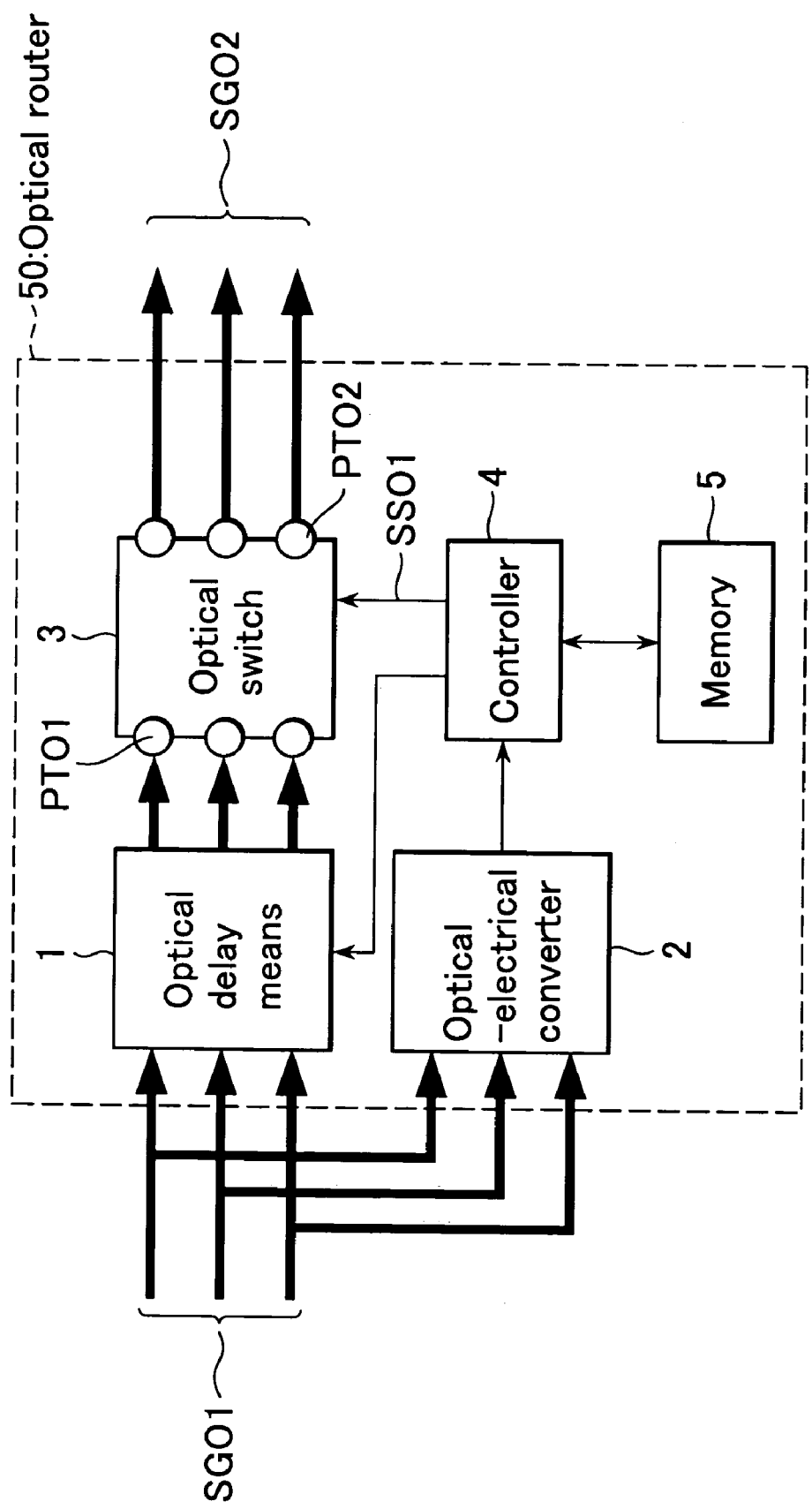
FIG. 1 is a block diagram illustrating an example of a conventional optical router.

In FIG. 5, optical delay means 1, optical-electrical converter 2 and optical switch 3 are identical to those shown in FIG. 1, while controller 8 for controlling the optical path selection of optical switch 3 and memory 9 wherein path control information, such as routing tables, and delay time information are stored are shown in FIG. 5. In addition, optical delay means 1, optical-electrical converter 2 and optical switch 3, controller 8 and memory 9 compose optical router 51. Note that the specific example of optical delay means 1 is the same as that shown in FIG. 2 and, therefore, will not be described here.

In FIG. 5, the three optical input signals indicated by SG41 are input to the three input ends of optical delay means 1, as well as to the three input ends of optical-electrical converter 2.

Optical output signals from the three output ends of optical delay means 1 are input to the three input ports of optical switch 3, and the three optical output signals indicated by SG42 in FIG. 5 are output from the three output ports of optical switch 3.

The electrical output signal of optical-electrical converter 2 is coupled with controller 8, and the electrical delay control signal of controller 8 and the electrical routing control signal thereof indicated by SS41 in FIG. 5 are coupled with the control terminals of optical delay means 1 and optical switch 3. In addition, the electrical input-output signal of controller 8 is mutually coupled with memory 7.

Now the behavior of the embodiment of the optical router illustrated in FIG. 5 is described by referring to FIGS. 6, 7, 8 and 9. Note however that parts of the embodiment identical to those of the example of the conventional optical router illustrated in FIG. 1 are excluded from the description.

Figure 6:
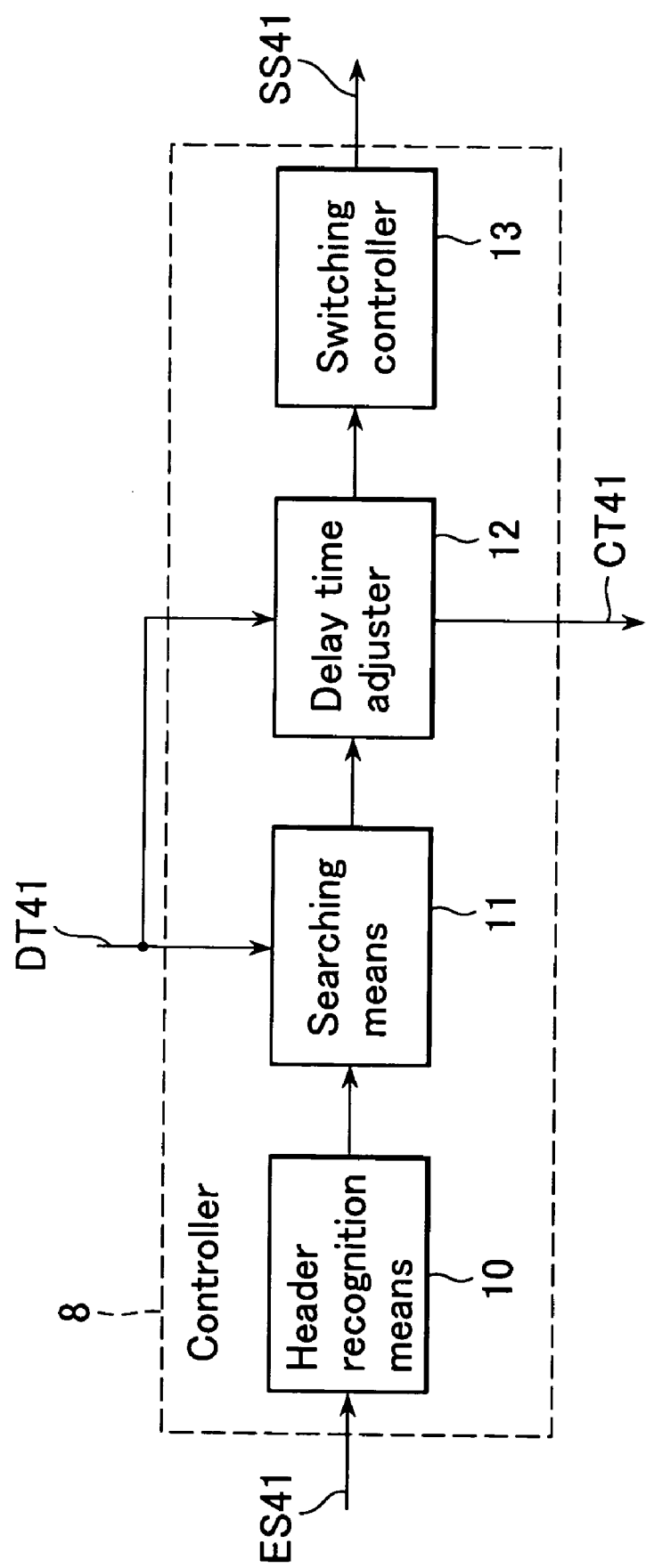
FIG. 6 is a block diagram illustrating in detail one example of controller 8.
Figure 8:
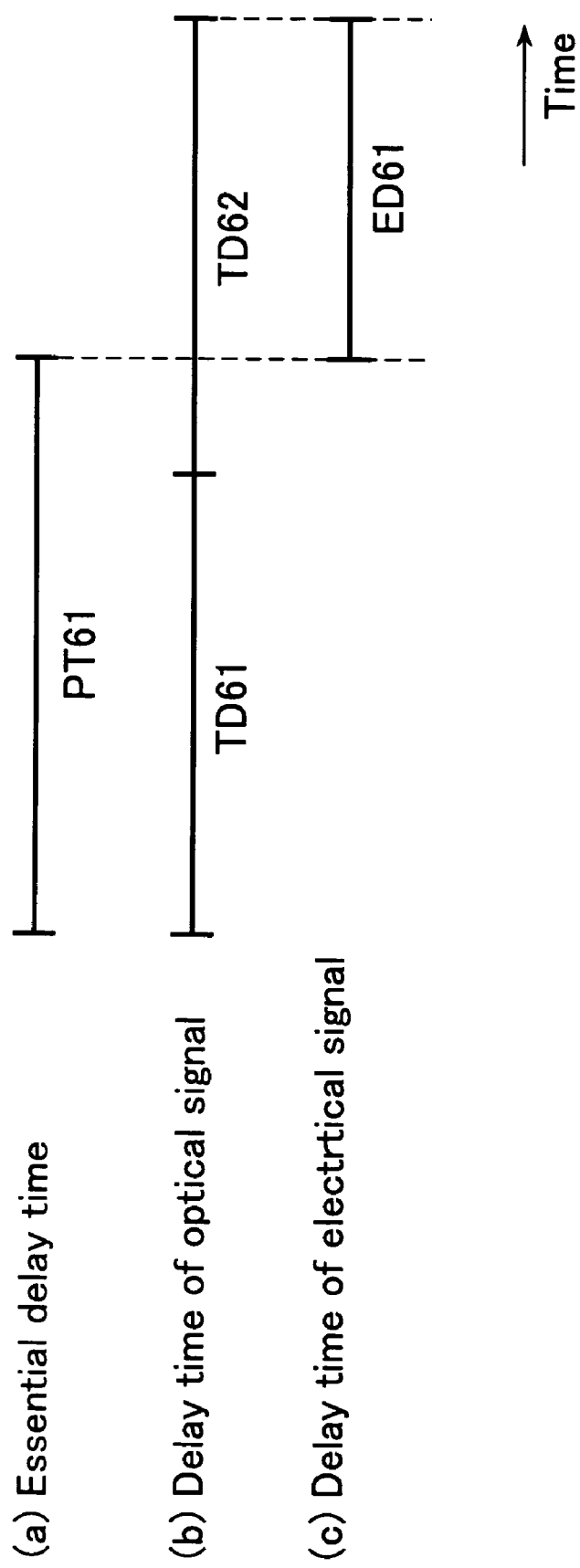
FIG. 8 is a timing diagram illustrating the relationship between types of delay time.
Figure 9:
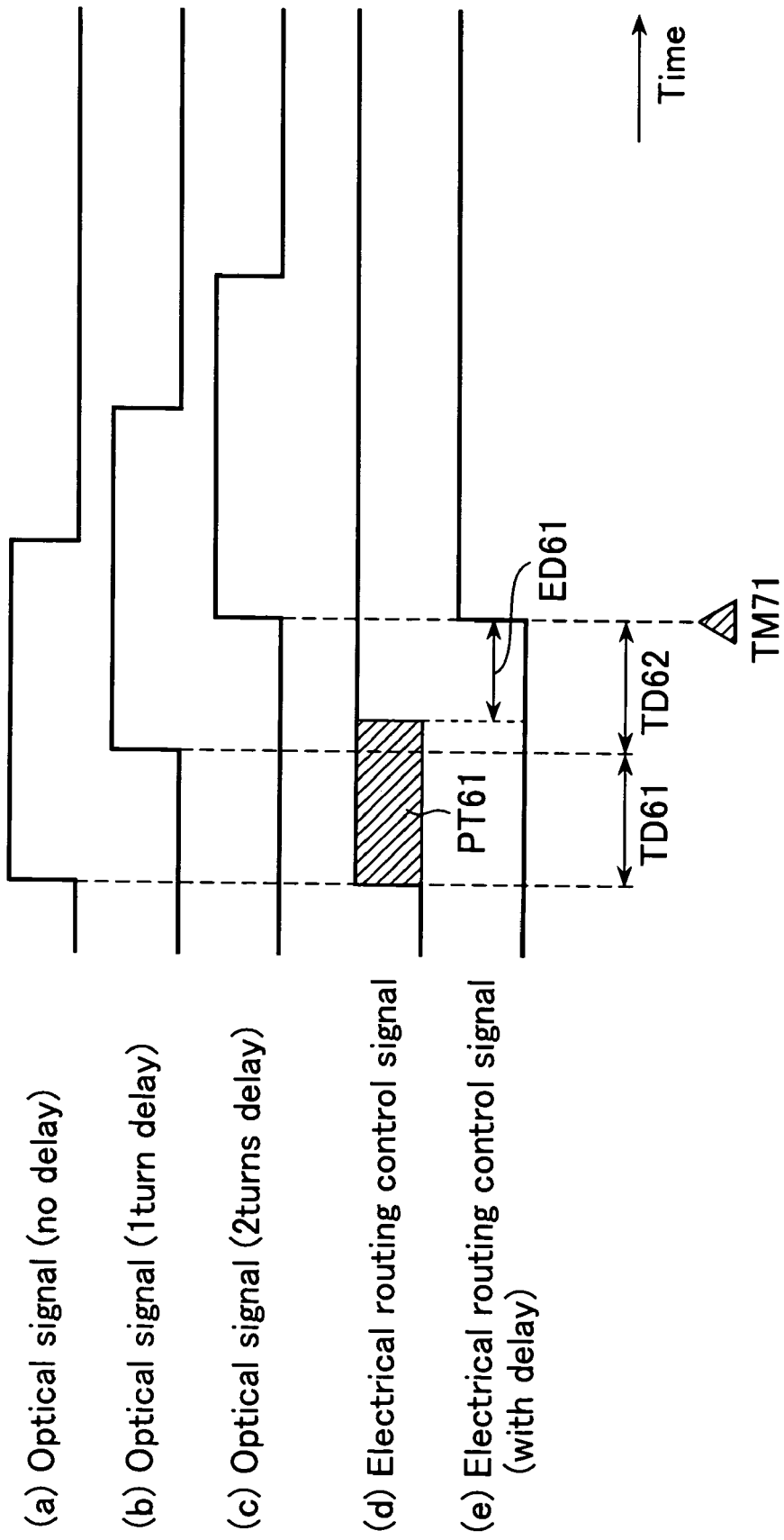
FIG. 9 is a timing diagram illustrating the relationship between the optical signals and electrical routing control signal.

FIG. 6 is a block diagram illustrating in detail one example of controller 8, FIG. 7 is a timing diagram illustrating an example of delay time information stored in memory 9, FIG. 8 is a timing diagram illustrating the relationship between types of delay time, and FIG. 9 is a timing diagram illustrating the relationship between the optical signals and electrical routing control signal.

In FIG. 6, controller 8 and symbols ES41, DT41, CT41 and SS41 are identical to those shown in FIG. 5, while header recognition means 10, searching means 11, delay time adjuster 12 and switching controller 13 are further shown in FIG. 6.

The output signal of optical-electrical converter 2 indicated by ES41 in FIG. 6 is coupled with header recognition means 10 and the output of header recognition means 10 is connected to searching means 11. In addition, an output (path control information) from memory 9 indicated by DT41 is input to searching means 11.

The output of searching means 11 is connected to delay time adjuster 12, the output (delay time information) of memory 9 indicated by DT41 is also connected to delay time adjuster 12, and the electrical delay control signal indicated by CT41 is coupled with the control terminal of optical delay means 1.

The output of delay time adjuster 12 is connected to switching controller 13 and the electrical routing control signal of switching controller 13 indicated by SS41 in FIG. 6 is coupled with the control terminal of optical switch 3.

The optical input signals, which are indicated by SG41 in FIG. 5, and contain routing information, such as the destination addresses added to the header parts thereof, are delayed at optical delay means 1 by desired lengths of time just long enough for controller 8 or any other element to process electrical signals.

Concurrently, the optical input signals, which are indicated by SG41 and contain routing information, such as the destination addresses added to the header parts thereof, are converted to electrical signals by optical-electrical converter 2 and input to controller 8 (header recognition means 10)

Header recognition means 10 extracts the routing information from the electrical signal input from optical-electrical converter 2, and searching means 11 finds the path control information stored in memory 9 according to the routing information and specifies a subsequent-stage optical router (output port) appropriate for the entered optical signals to be transmitted to the destination by the shortest path.

For example, controller 11 controls optical switch 3 so that an optical path is selected in such a manner that an optical input signal is input to the input port of optical switch 3 indicated by PT41 in FIG. 5, and is output from the output port of optical switch 3 indicated by PT42.

In addition, delay time adjuster 12 determines the length of time just long enough for controller 8 or any other element to process electrical signals (hereinafter referred to as essential delay time) according to delay time information stored in memory 9.

For example, the delay time information stored in memory 9 is such as shown in FIG. 7, containing a delay time dependent on whether or not FEC processing is applied, a delay time dependent on a difference in the algorithm of FEC processing and a delay time produced when a forwarding error occurs.

This means that if previously programmed to perform FEC processing, delay time adjuster 12 selects a correct algorithm according to the degree of error in the received data, or regards the received data as a forwarding error and performs the required processing, such as issuing a request to resend the data.

For example, if the option wherein delay time adjuster 12 performs FEC processing using algorithm B is selected, then the essential delay time is the sum of the normal delay time indicated by DT51 in FIG. 7 and produced when FEC processing is not applied and the delay time indicated by DT53 and produced when FEC processing is applied using algorithm B, according to the delay time information shown in FIG. 7.

At this point, from the essential delay time thus determined, delay time adjuster 12 determines the delay time of optical delay means 1 (hereinafter referred to as the optical signal delay time) and a delay time whereby the electrical routing control of signal optical switch 3 is electrically delayed within delay time adjuster 12 (hereinafter referred to as the electrical signal delay time).

Since the delay time produced by optical delay means 1 is an integer multiple (number of circulations or turns) of the one-turn delay time as mentioned earlier, delay time adjuster 12 determines an integer value (number of circulations or turns) at which the optical signal delay time at optical delay means 1 exceeds the essential delay time.

For example, the optical signal delay time exceeds essential delay time PT61 in the second turn in the example shown in FIG. 8. Consequently, the optical signal delay time is TD61+TD62 (where TD61=TD62).

In addition, delay time adjuster 12 subtracts the essential delay time from the optical signal delay time thus determined in order to establish electrical signal delay time ED61.

For example, electrical signal delay time ED61 equals (TD61+TD62)−PT61 in the example shown in FIG. 8.

Next, delay time adjuster 12 controls optical delay means 1 so that the optical input signal is delayed by the optical signal delay time, and delays the abovementioned electrical routing control signal by electrical signal delay time ED61 before outputting the optical input signal to switching controller 13. Finally, switching controller 13 controls optical switch 3 to switch the optical path according to the electrical routing control signal which is output from delay time adjuster 12 and has been delayed by electrical signal delay time ED61.

Let us take FIG. 9, which is a timing diagram illustrating the relationship between optical signals and an electrical routing control signal as an example. FIG. 9 shows optical signal (no delay) (a), optical signal (one-turn delay) (b) whose number of circulations (turns) at the optical loop comprised of optical fiber 7 is one, and optical signal (two-turn delay) (c) whose number of circulations (turns) is two.

The time length indicated by PT61 in FIG. 9 in (d) electrical routing control signal is an essential delay time. In order to secure a processing time such as this time length, delay time adjuster 12 controls optical delay means 1 so that the optical signal is delayed by the optical signal delay time TD61+TD62 (two-turn delay).

On the other hand, delay time adjuster 12 delays electrical routing control signal (d) by electrical signal delay time ED61 before outputting electrical routing control signal (e) to optical switch 3. Therefore, in practice, electrical routing control signal (e) is delayed by the time length (PT61+ED61) which is the sum of the essential delay time and the electrical signal delay time before being output.

In other words, the timing at which electrical routing control signal (e) is output is the timing indicated by TM71 in FIG. 9 and agrees with the timing at which the optical input signal is transmitted from optical delay means 1.

Figure 4:
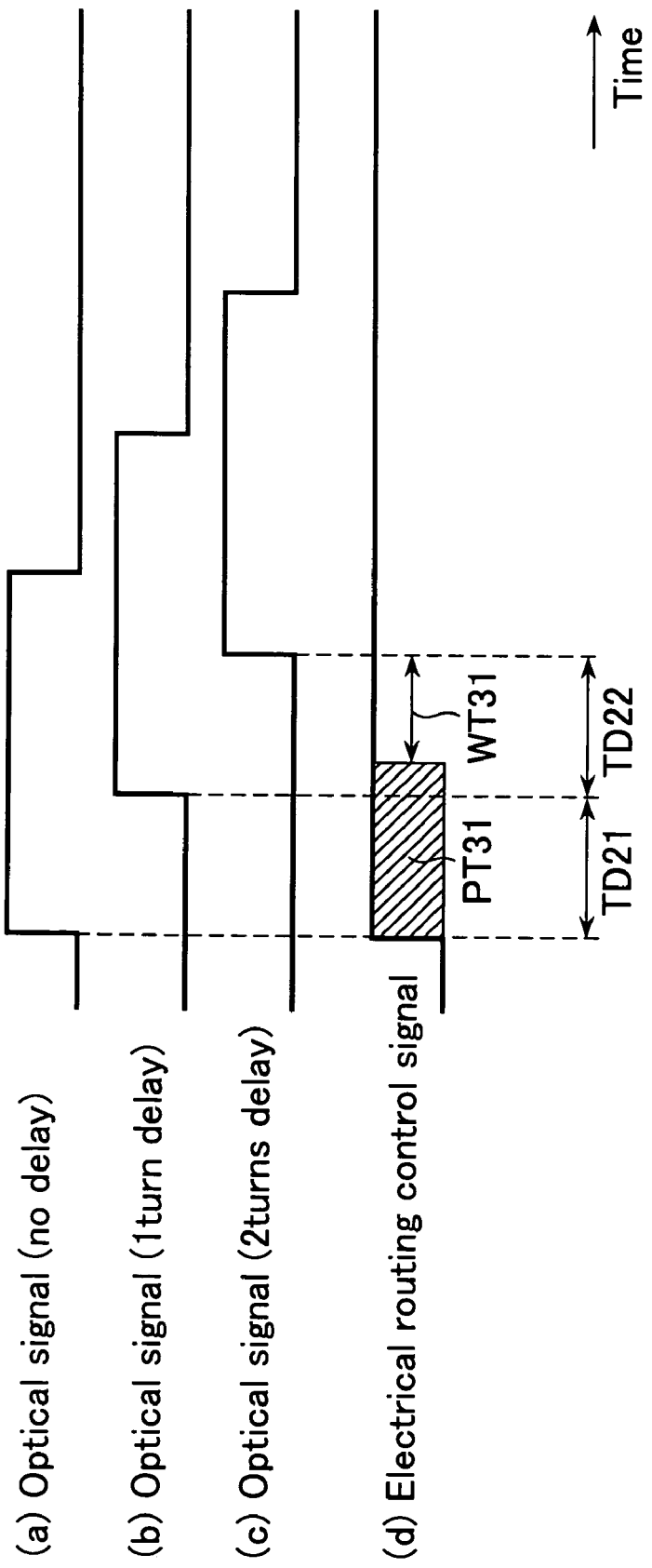
FIG. 4 is a timing diagram illustrating the relationship between types of delay time.

For this reason, it is possible to eliminate the dead time, which is indicated by WT31 in FIG. 4, shown with regard to the example of the conventional optical router, during which the optical paths of optical switch 3 are occupied even though none of the optical paths is used (no optical signals are being transmitted).

Consequently, it is possible to eliminate the dead time during which the optical paths of optical switch 3 are occupied, by determining the essential delay time by means of controller 8 (delay time adjuster 12), as well as the optical signal delay time and electrical signal delay time, thereby delaying the optical input signal and electrical routing control signal so that the timings thereof are synchronized. As a result, it is possible to efficiently allocate optimum optical paths to optical signals at optimum timings.

Figure 2:
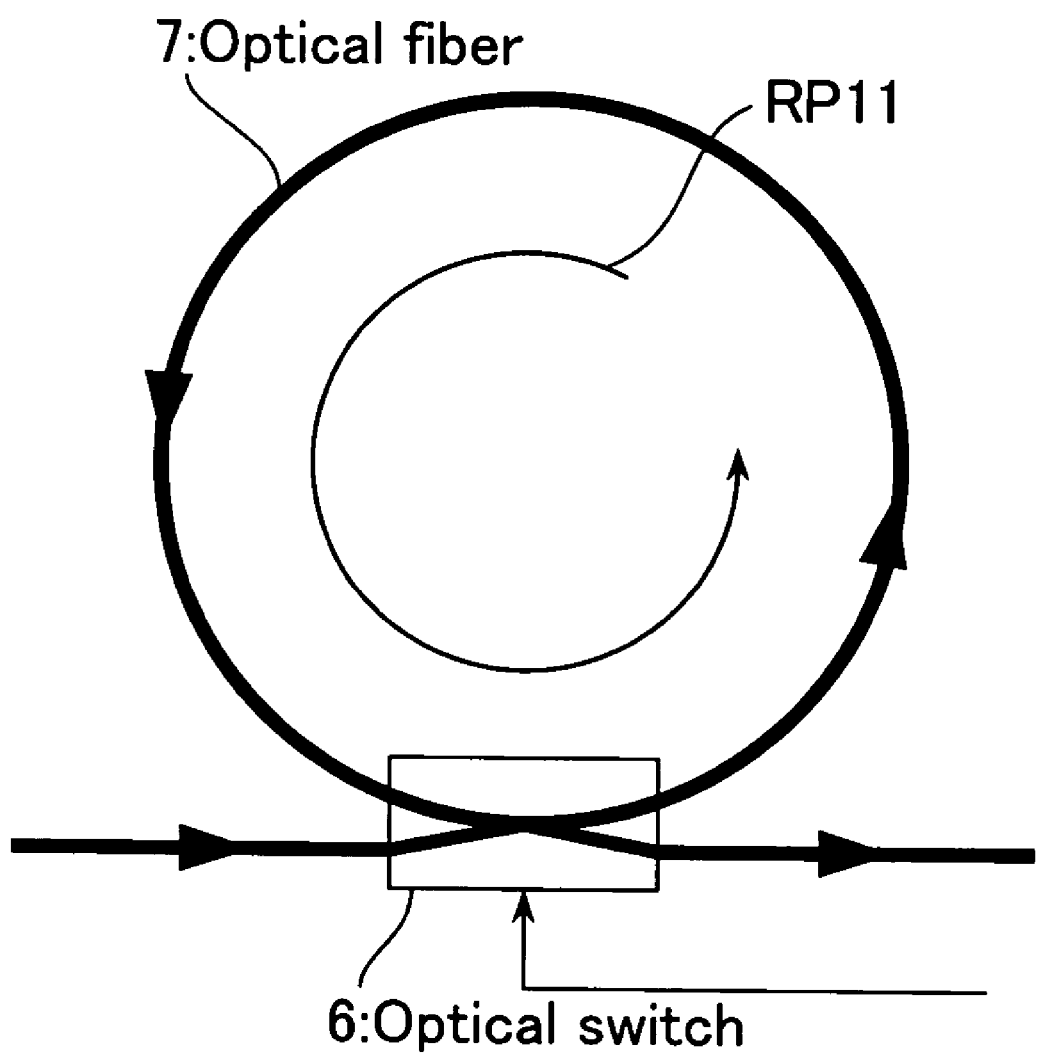
FIG. 2 is a schematic view explaining a specific example of optical delay means 1.
Figure 3:
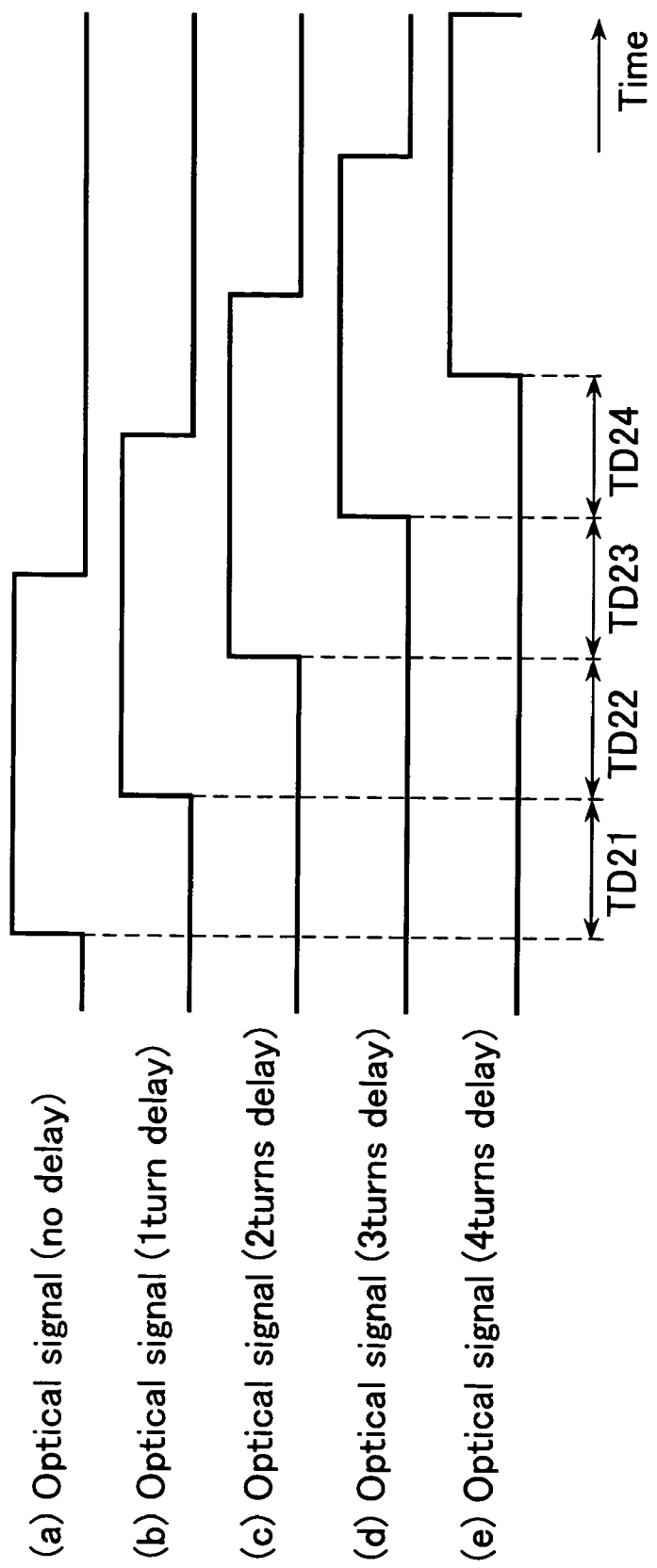
FIG. 3 is a timing diagram illustrating how delay times are produced by optical delay means 1.

Note that in the embodiment illustrated in FIG. 5, a specific example as is illustrated in FIG. 2 is shown as optical delay means 1 and the optical signal delay time is made variable in integer-multiple increments of a specific time length. Alternatively, the delay time of optical delay means 1 may be fixed (at one turn, for example) as long as it is known that no FEC processing is applied, no forwarding error occurs and no significant delay takes place.

Also note that in the embodiment illustrated in FIG. 5, a specific example as is illustrated in FIG. 2 is shown as optical delay means 1. Alternatively, the optical delay means may be comprised of a plurality of optical loops that have different optical fiber lengths (delay times) and are connected either in series or in parallel.

Figure 10:
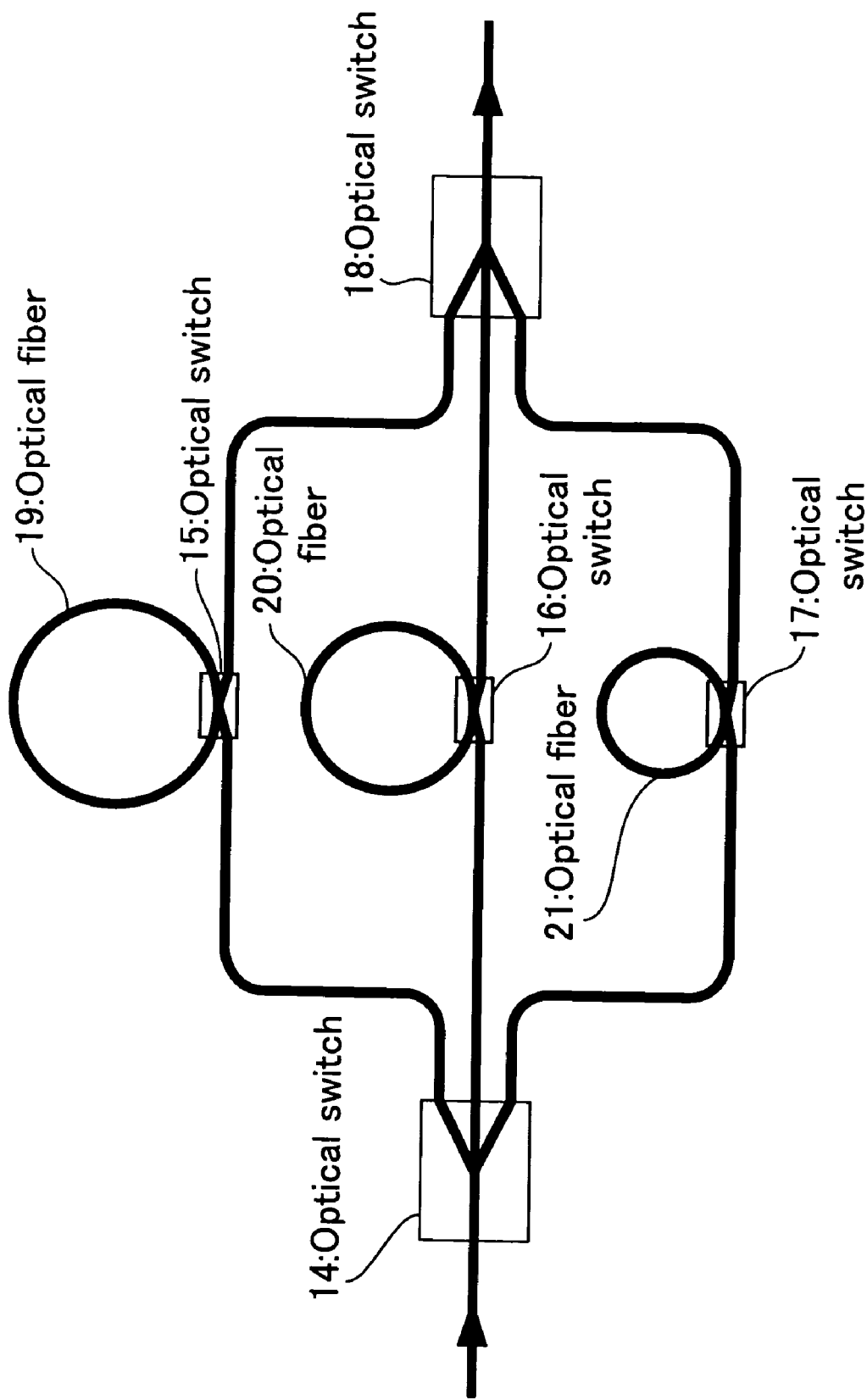
FIG. 10 is a schematic view illustrating the way a plurality of optical loops with different optical fiber lengths are connected in parallel.
Figure 11:
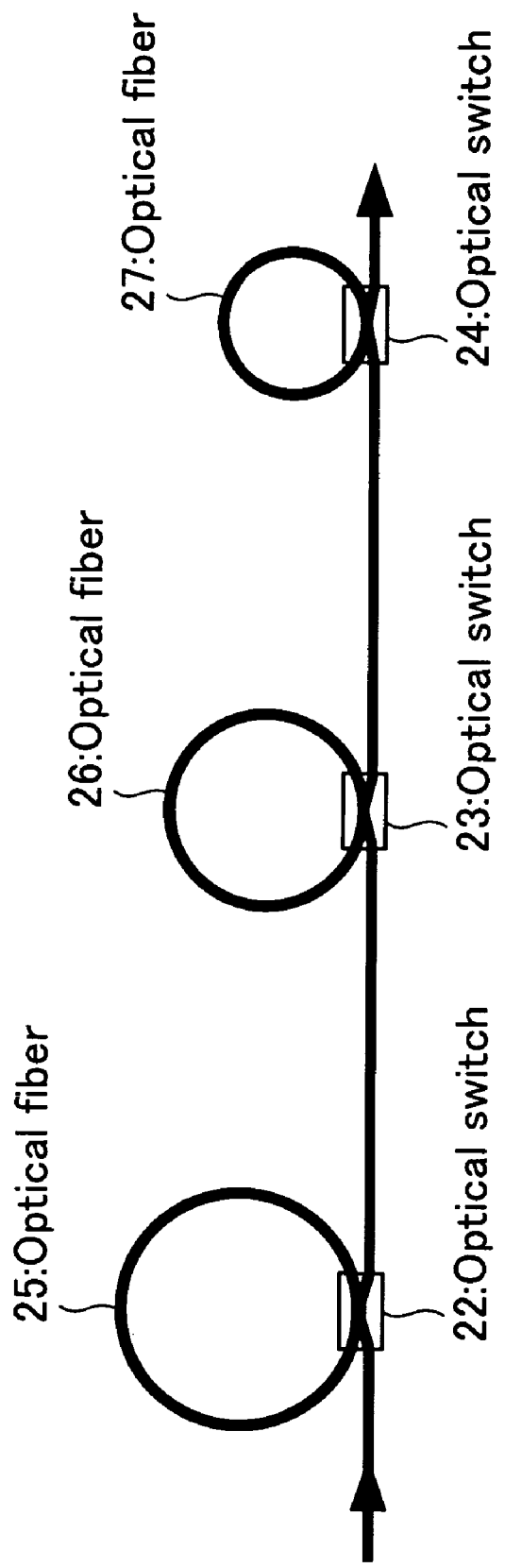
FIG. 11 is a schematic view illustrating the way a plurality of optical loops with different optical fiber lengths are connected in series.

FIG. 10 is a schematic view illustrating an example of the way a plurality of optical loops with different optical fiber lengths (delay times) are connected in parallel, while FIG. 11 is a schematic view illustrating an example of the way a plurality of optical loops with different optical fiber lengths (delay times) are connected in series.

In FIG. 10, optical switches 14, 15, 16, 17 and 18 and optical fibers 19, 20 and 21 are shown. An optical input signal is input to optical switch 14, the three output ends of optical switch 14 are respectively connected to the input ends of optical switches 15, 16 and 17 to which the optical loops of optical fibers 19, 20 and 21 are also connected.

In addition, the output ends of optical switches 15, 16 and 17 are respectively connected to the three input ends of optical switch 18 and the output end thereof is connected to subsequent-stage optical switch 3 (not shown in the figure).

Using an optical delay means such as is illustrated in FIG. 10, it is possible to set the optical signal delay time to a higher resolution by appropriately selecting a different optical fiber length (equivalent to a delay time resolution) by means of optical switch 14.

On the other hand, in FIG. 11, optical switches 22, 23 and 24, and optical fibers 25, 26 and 27 are shown. An optical input signal is input to the input end of optical switch 22 to which the optical loop of optical fiber 25 is connected, and the output end of optical switch 22 is connected to the input end of optical switch 23 to which the optical loop of optical fiber 26 is connected.

In addition, the output end of optical switch 23 is connected to the input end of optical switch 24 to which the optical loop of optical fiber 27 is connected, and the output end of optical switch 24 is connected to subsequent-stage optical switch 3 (not shown in the figure).

Using such an optical delay means as is shown in FIG. 11, it is possible to set the optical signal delay time to higher resolutions by appropriately adjusting the number of circulations (turns) at different optical fiber lengths (delay times) by means of optical switches 22, 23 and 24.

Although in the embodiment illustrated in FIG. 6, no example of means for delaying the electrical routing control signal at delay time adjuster 12 using the electrical signal delay time is shown specifically, such means can be embodied by connecting a plurality of delay circuits either in parallel or in series in the same way as for the optical delay means described above.

It is also possible to previously store the delay time information of the above-mentioned delay circuits in memory 9, so that delay time adjuster 12 makes a selection from the delay circuits according to the delay time information thereof.

It is also possible to add priority information to the header parts of optical signals in addition to routing information, such as destination addresses, so that the delay times (optical signal delay time and electrical signal delay time) are adjusted according to the priority information.

For example, by adding a specific delay time to the essential delay time for lower-priority optical signals to lengthen the delay time thereof so that the optical signals are retained at the optical router, and by letting higher-priority optical signals pass through the optical router with the shortest possible delay time without adding such a specific delay time as mentioned above, it is possible to preferentially let the higher-priority optical signals pass through the optical router.

It is also possible to store delay time information appropriate for the above-mentioned wavelengths in memory 9 in cases where optical signals having a plurality of wavelengths are used.

In addition, the delay time information to be stored in memory 9 can be either actually measured delay time values or calculated delay time values.

It is also possible to add delay time information to the header parts of optical signals in addition to routing information, such as destination addresses, in order to update the delay time information stored in memory 9.

As is evident from the description heretofore given, the following advantageous effects are provided according to the present invention:

Consequently, it is possible to eliminate dead time during which the optical paths of an optical switch are occupied, by determining the essential delay time by means of a controller (delay time adjuster), as well as the optical signal delay time and electrical signal delay time, thereby delaying the optical input signal and electrical routing control signal so that the timings thereof are synchronized. Thus, it is possible to efficiently allocate optimum optical paths to optical signals at optimum timings.

It is also possible to add priority information to the header parts of optical signals in addition to routing information, such as destination addresses, so that the delay times (optical signal delay time and electrical signal delay time) are adjusted according to the priority information, thereby preferentially allowing higher-priority optical signals to pass through the optical router.

What is claimed is:

1. An optical router which is disposed on an optical node basis, selects optical paths for optical signals that are transmitted through such optical transmission lines as optical fibers, and outputs said optical signals through said optical paths, whereby an optical communications network is formed, said optical router comprising:
   optical delay means for delaying a plurality of said optical signals containing routing information attached to the header parts thereof by an optical signal delay time;
   an optical switch provided with a plurality of input ports whereto a plurality of optical outputs of said optical delay means are input and with a plurality of output ports wherefrom said optical signals are output;
   an optical-electrical converter for converting a plurality of said optical signals to electrical signals;
   memory wherein path control information and delay time information are stored; and
   a controller for generating an electrical routing control signal whereby to change the optical paths of said optical signals by finding said path control information according to said routing information extracted from the output of said optical-electrical converter and for delaying said electrical routing control signal by an electrical signal delay time determined according to said delay time information before outputting said electrical routing control signal to said optical switch.

2. The optical router of claim 1, wherein said controller is comprised of:
   header recognition means for extracting said routing information;
   searching means for finding said path control information and generating said electrical routing control signals used to change the optical paths of said optical signals;
   a delay time adjuster for delaying said electrical routing control signals by an electrical signal delay time determined according to said delay time information; and
   a switching controller for outputting said electrical routing control signals to said optical switch to determine an optical path.

3. The optical router of claim 1 or 2, wherein said controller or said delay time adjuster determines said electrical signal delay time by subtracting a time length, which has been determined according to said delay time information and is just long enough for processing electrical signals, from said optical signal delay time.

4. The optical router of claim 1 or 2, wherein said optical delay means is configured so that said optical signal delay time can be varied in integer-multiple increments of a specific time length as controlled by said controller or said delay time adjuster.

5. The optical router of claim 1 or 2, wherein said controller or said delay time adjuster adds a time length to said optical signal delay time according to priority information attached to said optical signals in order to lengthen the delay time thereof.

6. The optical router of claim 5, wherein said priority information is attached to the header parts of said optical signals.

7. The optical router of claim 1 or 2, wherein said controller or said delay time adjuster updates said delay time information stored in said memory according to new delay time information attached to said optical signals.

8. The optical router of claim 7, wherein said new delay time information is attached to the header parts of said optical signals.

9. The optical router of claim 1 or 2, wherein said optical delay means is comprised of:
   optical loops of optical fibers; and
   optical switches for inputting said optical signals to said optical loops or outputting said optical signals from said optical loops, as controlled by said controller or said delay time adjuster.

10. The optical router of claim 1 or 2, wherein said optical delay means is comprised of:
   the optical loops of a plurality of optical fibers having different optical fiber lengths;
   a plurality of optical switches for inputting said optical signals to said optical loops or outputting said optical signals from said optical loops, as controlled by said controller or said delay time adjuster; and
   a second optical switch for selecting one optical loop from a plurality of said optical loops.

11. The optical router of claim 1 or 2, wherein said optical delay means is comprised of:
   the optical loops of a plurality of optical fibers having different optical fiber lengths; and
   a plurality of optical switches for inputting said optical signals to said optical loops or outputting said optical signals from said optical loops, as controlled by said controller or said delay time adjuster;
wherein said optical loops and said optical switches are respectively connected in series.

* * * * *